United States Patent [19]

Cameron

[11] Patent Number: 5,394,981
[45] Date of Patent: Mar. 7, 1995

[54] HINGED STORAGE CONTAINER FOR COMPUTER DISKETTES AND DOCUMENTATION

[75] Inventor: Michael Cameron, Prairie Village, Kans.

[73] Assignee: Cameron Product Specialties, Inc., Overland Park, Kans.

[21] Appl. No.: 42,698

[22] Filed: Apr. 5, 1993

[51] Int. Cl.⁶ ............................................. B65D 69/00
[52] U.S. Cl. ................................. 206/232; 206/311; 206/312
[58] Field of Search ............... 206/232, 309, 311, 312, 206/444, 387

[56] References Cited

U.S. PATENT DOCUMENTS

| | | | |
|---|---|---|---|
| 1,683,479 | 9/1928 | Nystrom | 206/311 X |
| 4,433,780 | 2/1984 | Ellis | 206/232 |
| 4,588,321 | 5/1986 | Egly | 206/444 X |
| 4,640,413 | 2/1987 | Kaplan et al. | 206/444 X |
| 4,765,462 | 8/1988 | Rose, Jr. | 206/45.13 |
| 4,776,457 | 10/1988 | Ferraroni | 206/45.23 |
| 4,776,463 | 10/1988 | Press | 206/444 |
| 4,793,477 | 12/1988 | Manning | 206/444 X |
| 4,805,769 | 2/1989 | Soltis et al. | 206/309 |
| 4,869,364 | 9/1989 | Bray | 206/232 |
| 4,919,259 | 4/1990 | Beaulieu | 206/444 X |
| 4,928,828 | 5/1990 | Cohen | 206/444 |
| 4,957,205 | 9/1990 | Rose, Jr. | 206/444 |
| 4,977,483 | 12/1990 | Perretta | 206/232 X |
| 5,022,516 | 6/1991 | Urban et al. | 206/45.13 |
| 5,088,602 | 2/1992 | Heyderman et al. | 206/387 |
| 5,188,230 | 2/1993 | O'Brien et al. | 206/444 X |
| 5,193,681 | 3/1993 | Lievsay | 206/311 X |
| 5,205,405 | 4/1993 | O'Brien et al. | 206/312 X |

FOREIGN PATENT DOCUMENTS

| | | | |
|---|---|---|---|
| 3335558 | 4/1985 | Germany | 206/387 |
| 2132588 | 7/1984 | United Kingdom | 206/444 |

*Primary Examiner*—Paul T. Sewell
*Assistant Examiner*—Ted Kavanaugh

[57] ABSTRACT

An injection molded storage container is provided which is formed with three covers or walls and a spine for storing magnetic media and documentation. Two living hinges on either side of the spine are connected to the edges of the first wall and the second wall, respectively. Two sets of opposed sidewalls, molded to and perpendicular from the first wall, are connected to form a recess for holding documentation. A third wall is hinged to the top of the opposed sidewall which is parallel to and furthest from the spine. The third wall is sized to fit within the first set of opposed sidewalls. The inner surfaces of the first wall, third wall and opposed sidewalls form an interior enclosure. Vinyl pages for holding magnetic media are attached to the inner surface of the second wall. The second wall and spine fold over the interior enclosure.

3 Claims, 6 Drawing Sheets

HINGED STORAGE CONTAINER FOR COMPUTER DISKETTES AND DOCUMENTATION

BACKGROUND OF THE INVENTION

The present invention relates generally to storage containers and more particularly, storage containers that are used to store computer disks or compact discs.

DESCRIPTION OF THE PRIOR ART

Computer disks, which are used to store digital information, typically are available in two widely accepted sizes: five and one-quarter inch and three and one-half inch. In addition, digital information is encoded on compact discs. Computer disks and compact discs hold vast amounts of digital data. Computer programmers often store computer disks and compact discs in plastic molded cases or in specially designed trays that hold either one or both sizes of the computer disks and/or the compact discs. Examples /f cases or trays for holding computer disks can be found in patents issued to O. Urban, et al., U.S. Pat. No. 5,022,516; S. Ferraroni, U.S. Pat. No. 4,776,457; R. Press, U.S. Pat. No. 4,776,463; B. Nemeth, U.S. Pat. No. 4,735,309; and A. Northrup et al., U.S. Pat. No. 4,640,416. The disadvantage with these types of cases and trays is that they do not contain separate enclosures or storage areas for holding the handwritten, typed or printed hard copy of instructions or code ("documentation") relating to such computer disks or compact discs.

In order to overcome the disadvantage cited with respect to conventional cases or trays, the computer disks or compact discs are sometimes stored together with the documentation by placing such computer disks or compact discs in flexible, loose-leaf vinyl plastic pages that are punched with holes for placement in a ring-type notebook binder. Software programmers and others then type or print the computer documentation on loose-leaf paper pages and place them in the ringed binder. A disadvantage of storing computer disks or compact discs with the documentation in this manner is that commercially available flexible, loose-leaf vinyl plastic pages used to hold computer disks or compact discs are not constructed in a manner which prevents the computer disks or compact discs from falling out should the ringed binder be inadvertently turned sideways or inverted. The impact and contact of the computer disk or compact disc with a surface containing foreign particles or contaminants could result in the destruction of all or portions of the digitally encoded information on such fragile computer disk or compact disc.

Two examples of rigid plastic pages, as opposed to flexible, vinyl plastic page, for holding computer disks which overcomes the disadvantage reference above can be found in R. Rose, U.S. Pat. No. 4,957,205 and J. Cohen, U.S. Pat. No. 4,928,828. These two patents illustrate rigid plastic pages with snap mechanisms which retain computer disks firmly in place should the ringed binder in which they are placed be turned sideways or inverted. An example of a notebook for storage of computer disks and loose-leaf documentation which also overcomes the disadvantage can be found in R. Rose, U.S. Pat. No. 4,765,462. This patent illustrates a notebook with a ring assembly which has incorporated therein a ridged portion in the bottom wall thereof in which a computer disk of a predetermined size can be inserted. The ridge assembly serves to retain the computer disk in place. However, the structure of the ridge in this notebook restricts the number of computer disks that can be inserted therein. In addition, the above referenced examples of the rigid plastic pages and the ridged notebook do not overcome another disadvantage inherent in using a ringed binder to hold both documentation and computer disks or compact discs. That disadvantage is that the documentation must be punched with holes that conform to the number of rings and spacing of rings in the ringed binder. Most commercially available software is accompanied with bound documentation which is often of a thickness which is not easily adaptable to being punched with holes for placement in a ringed binder. This problem is exacerbated because software publishers often package software and bound documentation in paperboard boxes which deteriorate. In the event the original package comes apart, users of such commercially available software are not able to avail themselves of the ringed binder as a method to store the computer disk or compact disc with the bound documentation. Therefore, such users often resort to storing the computer disks or compact discs in cases or trays such as those referenced above, apart from the bound documentation. Even if the documentation which accompanies the software is easily adaptable to the ringed binder cited herein, it may still become detached from the binder if it should tear at the punched holes.

SUMMARY OF THE INVENTION

It is therefore an object of the present invention to provide a storage container which, when closed, provides two separate enclosures, the first of which contains storage space for bound or unbound documentation, the second of which serves as a shell of additional protection for computer disks or compact discs which are inserted in flexible, vinyl plastic pages or pockets.

In a preferred embodiment, the integral, molded plastic storage container consists of four hingedly connected walls, with four side walls molded perpendicular to the inner, planar surface of a bottom wall. An interior wall is hingedly connected to the top edge of the side wall near the right side edge of the bottom 7all. The front edge and the back edge of the interior wall fit just within the side walls proximate the front edge and the back edge, respectively, of the bottom wall such that when the inner, planar surface of the hinged, interior wall is moved into a facing relationship with the inner, planar surface of the bottom wall, the bottom, interior, and side walls form an enclosure for holding bound or unbound documentation. A rear wall (spine) is hingedly connected to the left side edge of the bottom wall. The right side edge of a top wall is hingedly connected to the left side edge of the spine. A side wall is molded perpendicular to the inner, planar surface of the top wall near the left side edge of the top wall.

Attached to the inner, planar surface of the top wall are several flexible, loose-leaf type, vinyl plastic pages containing recess or pockets of varying dimensions. The pockets can be used to store computer diskettes, compact discs, program templates, quick reference cards and other related material. A clear, one-layer, vinyl plastic sheet covers is fused to the edges of the top, rear and bottom walls so as to create a pocket between the inner surface of the plastic sheet and the container. Title pages or other printed or written matter describing the contents of the container can be inserted, and clearly seen, in such pocket.

An advantage of the storage container of the present invention is that it provides two enclosures inside one storage container. One enclosure is for bound or unbound documentation related to software and the second enclosure for protection of computer disk or compact discs inserted in vinyl plastic pages. In such manner, the bound or unbound computer documentation can be stored in close proximity to the related computer disks or compact discs.

Another advantage of the storage container of the present invention is that when the storage container is in the closed and latched position, the storage container provides a sealed, dust-free environment which prevents the computer disks or compact discs and documentation from falling out should the storage container be turned sideways or inverted.

Another advantage of the present invention is that it is fabricated substantially from plastic material in an injection plastic molding process so as to facilitate manufacturing.

These and other objects and advantages of the present invention will become apparent following a reading of the following detailed description of the preferred embodiments which are illustrated in the several figures of the drawing.

BRIEF DESCRIPTION OF THE DRAWINGS

In the following drawings which form a part of the Specification and are to be read in conjunction therewith and in which like reference numerals are to be used to indicate like parts in the various views.

DETAILED DESCRIPTION OF THE PREFERRED EMBODIMENTS

Figure 1:
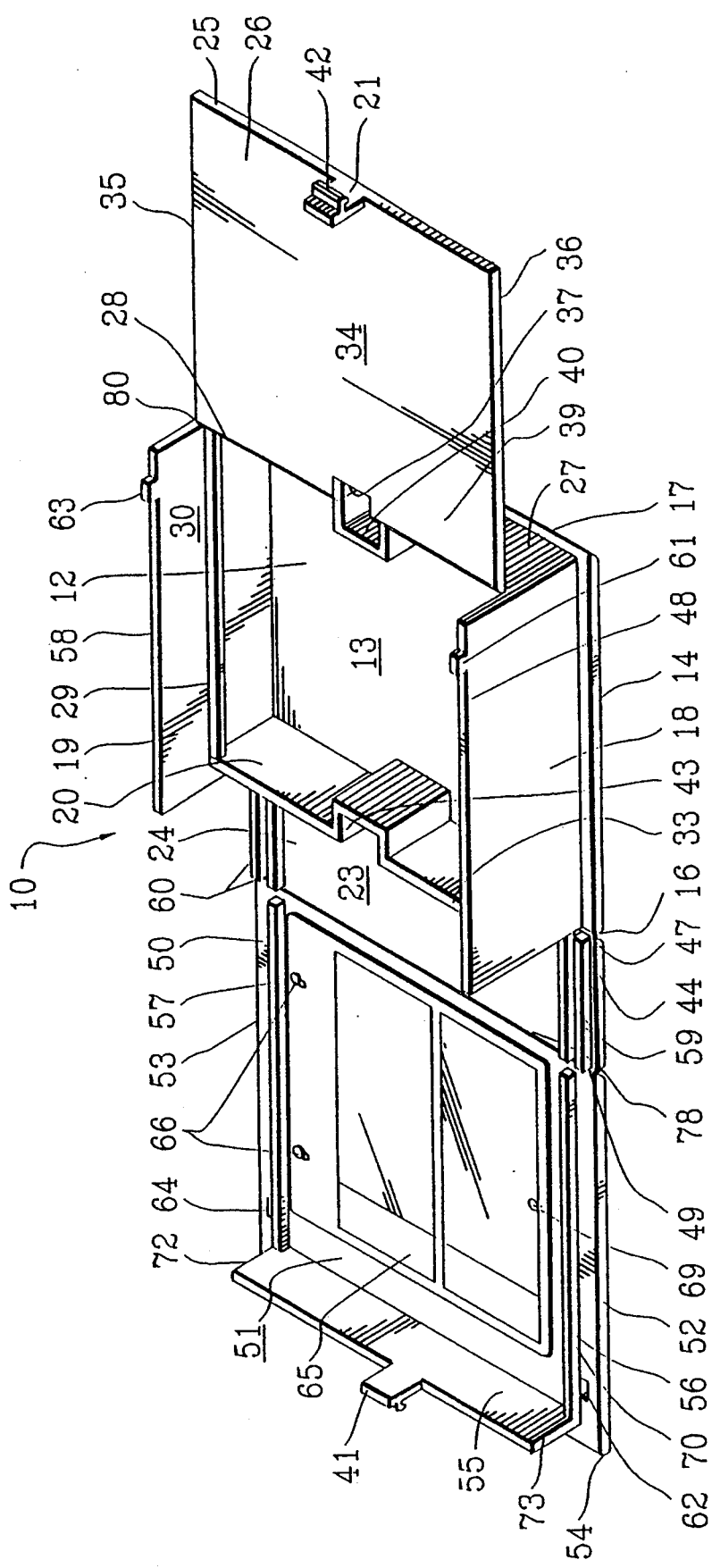
FIG. 1 is a perspective view of a molded plastic, hinged, storage container in accordance with the present invention for computer disks or compact discs, templates and related documentation shown in the open position. The container is shown without the software or documentation.

A preferred embodiment of the storage container of the present invention for storing computer disks or compact discs and documentation is illustrated in perspective view in FIG. 1 and is designated generally by the numeral 10. As shown therein, the storage container 10 is in the nature of a hinged enclosure. The container 10 includes a bottom wall 12 which has an inner, planar surface 13, a front edge 14, an opposed back edge 15 (seen in FIG. 2), a left side edge 16 and an opposed right side edge 17. Rigidly molded around the inner, planar surface 13 of the bottom wall 12 near the front edge 14, the left side edge 16, the back edge 15 and the right side edge 17, are four side walls extending from, and perpendicular with, the inner, planar surface 13.

A front side wall 18 is near, and parallel to, the front edge 14 of the bottom wall 12.

Figure 9:
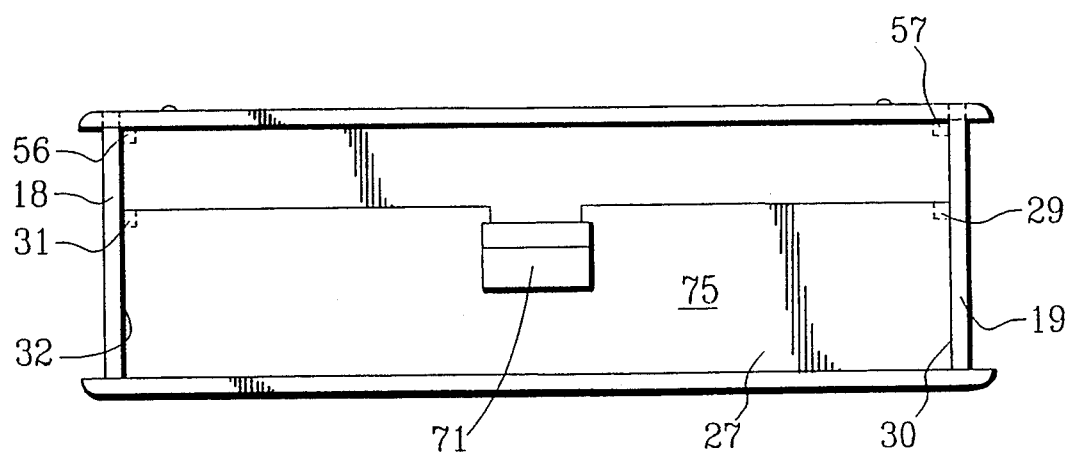
FIG. 9 is a front elevational view of the storage container shown in FIG. 1.

A back side wall 19 is near, and parallel to, the back edge 15 of the bottom wall 12 and is opposed from the front side wall 18. As illustrated in FIG. 9, the back side wall 19 is the same height as the front side wall 18.

Figure 6:
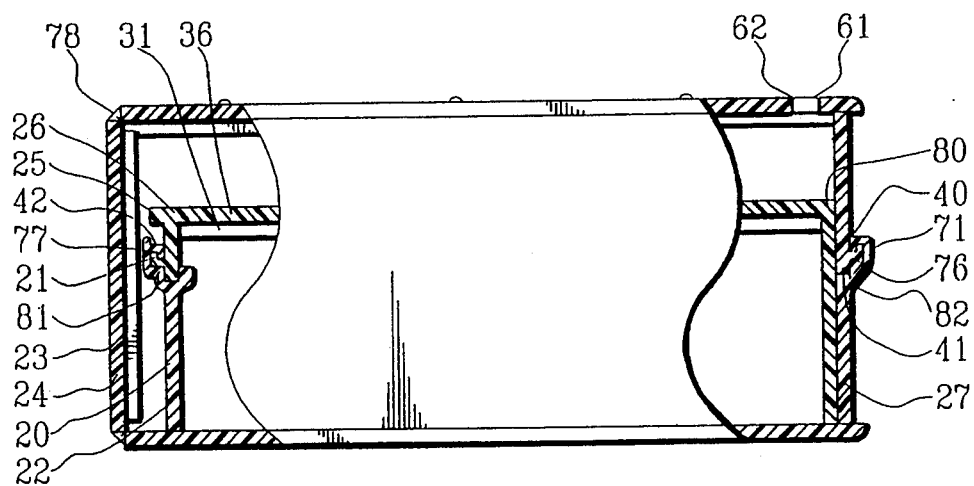
FIG. 6 is a cut-away side elevational view of the storage container shown in FIG. 1, illustrating the two enclosures that are formed when it is in the fully closed and latched position.
Figure 7:
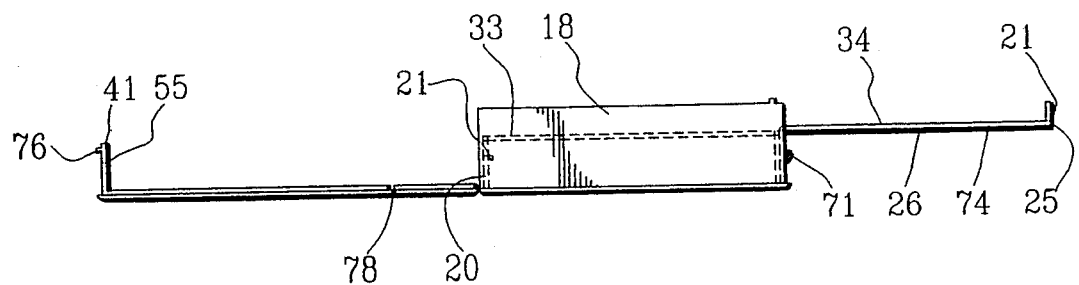
FIG. 7 is a view of the storage container of FIG. 1, shown from a side elevational view, in a fully open position.

A left side wall 20 is near, and parallel to, the left side edge 16 and is connected to the front side wall 18 and the back side wall 19. The left side wall 20 is about two-thirds the height of the front side wall 18 and the back side wall 19. As can be seen in FIG. 7, integrally molded as part of the left side wall 20 is a hingedly connected internal latch 21. As illustrated in FIG. 6, there is sufficient space between an outer surface 22 of the left side wall 20 and an inner, planar surface 23 of a rear 7all 24 (seen in FIG. 2), such that when the storage container 10 is in the latched and closed position, clearance is provided for an overhanging right side edge 25 of an interior wall 26 and to provide clearance for the internal latch 21.

A right side wall 27 is near the right side edge 17 and is connected to front side wall 18 and the back side wall 19. The right side wall 27 is opposed from the left side wall 20. The right side wall 27 is the same height as the left side wall 20. Integrally molded along a top edge 28 of the right side wall 27 is the interior wall 26.

Referring to FIG. 1, a back rib 29 is integrally molded into an inner, planar surface 30 of the back side wall 19. Referring to FIG. 9, a front rib 31 is integrally molded into an inner, planar surface 32 of the front side wall 18. The top of the front rib 31 is level with the top edge 28 (seen in FIG. 1) /f the right side wall 27 and a top edge 33 (seen in FIG. 7) of the left side wall 20. When an inner, planar surface 34 of the interior wall 26 is brought into a facing relationship with the inner, planar surface 13 of the bottom wall 12, a back edge 35 of the interior wall 26 is supported by the back rib 29 and a front edge 36 of the interior wall 26 is supported by the front rib 31 as seen in FIG. 6.

Figure 2:
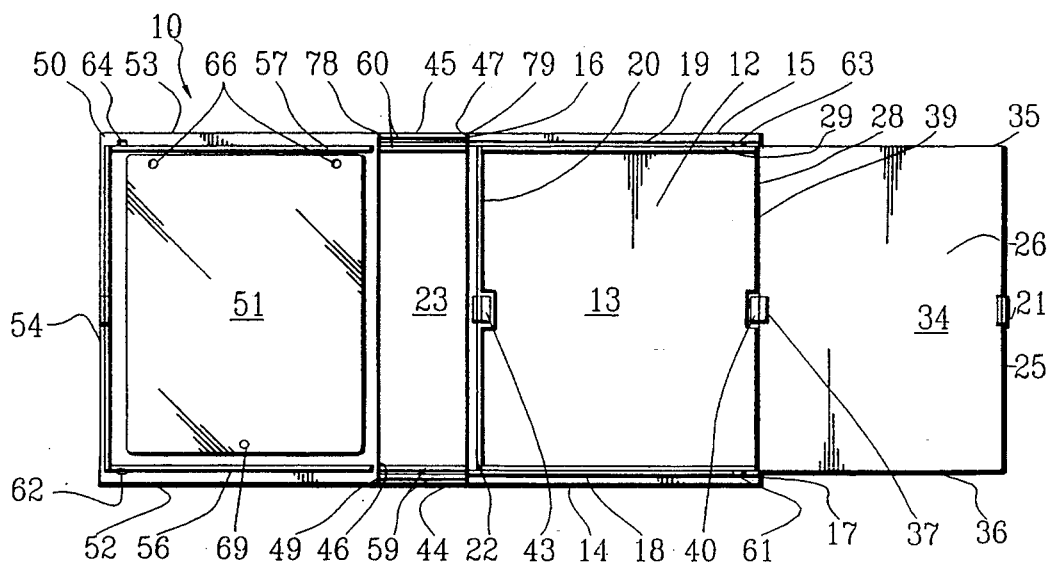
FIG. 2 is a top plan view of the storage container shown in FIG. 1 in a fully open position.

The preferred embodiment of the present invention includes a notch 37 in the interior wall 26 centered between the front edge 36 and the back edge 35 near a left side edge 39 as seen FIG. 2. The outline of the notch 37 matches the outline of a recess 40 when the inner, planar surface 34 of the interior wall 26 is moved into a facing relationship with the inner, planar surface 13 of the bottom wall 12. This allows an external catch 41 to clear the left side edge 39 of the interior wall 26 and rest in the recess 40 as seen in FIG. 6.

The internal latching mechanism consists of the hingedly attached internal latch 21 (seen in FIG. 6) and an internal catch 42 (seen in FIG. 1). The internal latch 21 is hingedly molded to the outer surface 22 of the left side wall 20. The longitudinal center line of the internal latch 21 is an equal distance from the back side wall 19 and the front side wall 18. The internal catch 42 is rigidly molded to, and is perpendicular with the inner, planar surface 34 near the right side edge 25 of the interior wall 26. The longitudinal center line of the internal catch 42 is an equal distance from the back edge 35 of the interior wall 26 and the front edge 36 of the interior wall 26. When the inner, planar surface 34 of the interior wall 26 is moved into a facing relationship with the inner, planar surface 13 of the bottom wall 12, the internal catch 42 comes to rest in a recess 43 of the left side wall 20.

Figure 3:
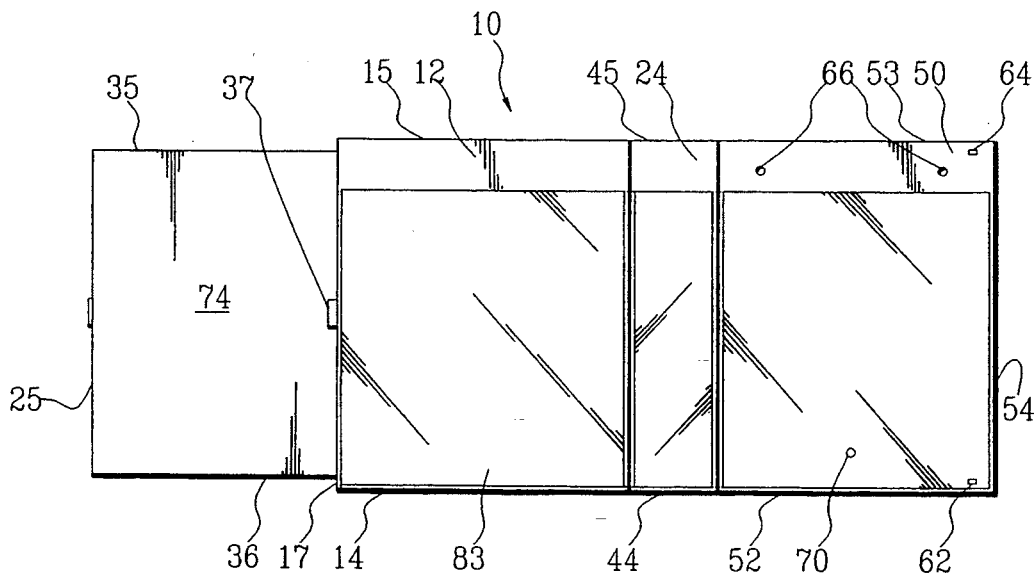
FIG. 3 is a view similar to that shown in FIG. 2 illustrating the opposite surface of the storage container in a fully open position.

Referring to FIG. 2 and FIG. 3, the rear wall 24 serves as the spine of the storage container 10. The rear wall 24 has a front edge 44, an opposed back edge 45, a left side edge 46 and an opposed right side edge 47. Referring to FIG. 1, the distance from the left side edge 46 to the right side 47 across the front edge 44 of the rear wall 24 is equal to the distance from the inner, planar surface 13 of the bottom wall 12 beginning near the base of the front side wall 18 to a top edge 48 of the front side wall 18, such that when the inner, planar surface 23 of the rear wall 24 is moved into a facing relationship with the outer surface 22 of the left side wall 20, the left side edge 46 of the rear wall 24 is even with the top edge 48 of the front side wall 18. The left side edge 16 of the bottom wall 12 is hingedly connected to the right side edge 47 of the rear wall 24. The left side edge 46 of the rear wall 24 is hingedly connected to a right side edge 49 of a top wall 50.

The top wall 50 is the final wall that is moved in order to fully enclose the storage container 10. The top wall 50 has an inner, planar surface 51, a front edge 52, an opposed back edge 53, the right side edge 49 and an opposed left side edge 54. A side wall 55, which is near, and parallel to, the left side edge 54 extends from, and is perpendicular with, the inner, planar surface 51. The side wall 55 is rigidly molded to the inner, planar surface 51. When viewed in the fully open position illustrated in FIG. 7, the side wall 55 is about one-third the height of the front side wall 18.

Referring to FIG. 2, a front aligning ridge 56 and a back aligning ridge 57 are rigidly molded to the inner, planar surface 51 of the top wall 50. Referring to FIG. 9, the back aligning ridge 57 is just inside the inner, planar surface 30 of the back side wall 19 and the front aligning ridge 56 is just inside the inner, planar surface 32 of the front side wall 18 when the storage container 10 is in the closed position. The back aligning ridge 57 and the front aligning ridge 56 serve to keep the back side wall 19 and the front side wall 18 from flexing inward should inward pressure be applied to the back side wall 19 or the front side wall 18. The aligning ridges also prevent any material or software that may have dislodged in the second, outer enclosure of the storage container from slipping out between a top edge 58 of the back side wall 19 or the top edge 48 of the front side wall 18 and the inner, planar surface 51 of the top wall 50.

Referring to FIG. 1, a front paired aligning ridges 59 are formed on the inner, planar surface 23 near, and parallel to, the front edge 44 of the rear wall 24. A back paired aligning ridges 60 are formed on the inner, planar surface 23 near, and parallel to, the back edge 45 of the rear wall 24. The front paired aligning ridges 59 and the back paired aligning ridges 60 serve to guide the rear wall 24 into position perpendicular to the bottom wall 12, for latching when the storage container 10 is closed.

Referring to FIG. 6, a peg 61 is rigidly formed on, and extends away from, the top edge 48 of the front side wall 18. The peg 61 mates in an aperture 62 which is cut through the top wall 50 when the storage container 10 is closed. Referring to FIG. 1, a peg 63 is rigidly formed on, and extends away from, the top edge 58 of the back side wall 19. The peg 63 mates in an aperture 64 which is cut through the top wall 50 when the storage container 10 is closed. The mating of each of the pegs in each of the apertures serves to keep the rear wall 24 perpendicular with the bottom wall 12 and the top wall 50 when the storage container 10 is in the closed and latched position.

Figure 4:
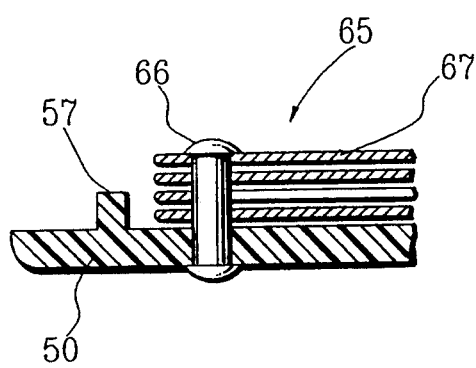
FIG. 4 is a partial cross section side view of the storage container, illustrating the back aligning ridge integrally molded to the inner, planar surface of the top wall and the upper edges of a stack of flexible, vinyl plastic pages attached to the top wall with one of the rivets.
Figure 8:
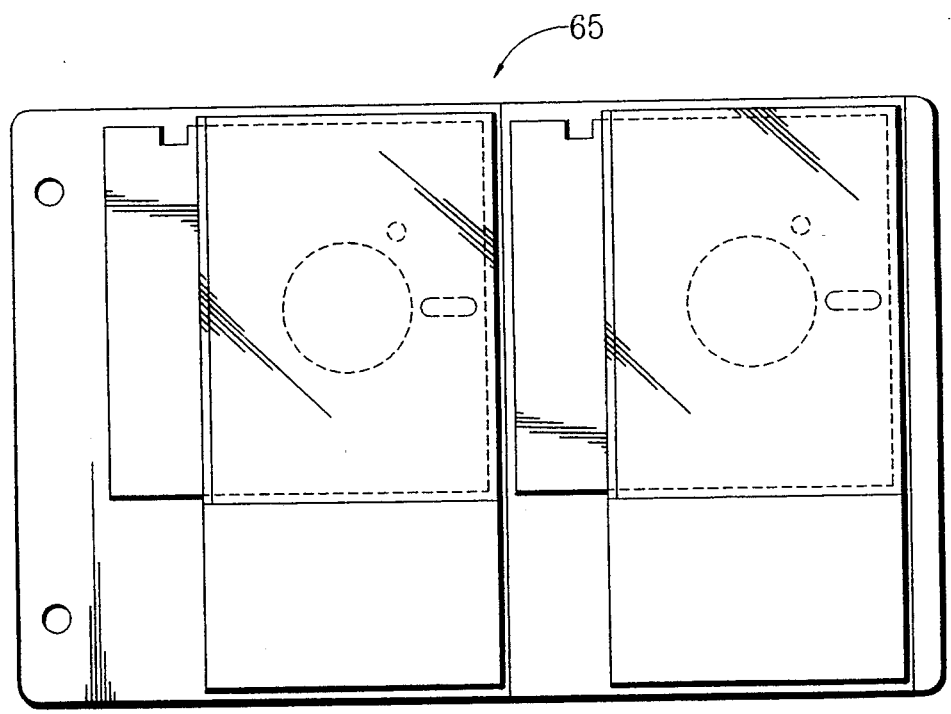
FIG. 8 is a view of a clear, flexible, vinyl plastic page holding 5.25 inch computer disks, with two holes near the upper edge through which the page is to be attached to the storage container shown in FIG. 1 with rivets.

Referring to FIG. 1, flexible vinyl plastic pages 65 are fastened to the inner, planar surface 51 of the top wall 50, just inside the back aligning ridge 57, with two rivets 66. The flexible vinyl plastic pages 65 are made of vinyl with anti-static characteristics. The two rivets 66 can be constructed of either metal or plastic. One of the two rivets 66 is located near the left side edge 54. The other of the two rivets 66 is located near the right side edge 49. Referring to FIG. 4, a cover sheet 67 serves as a cover for the flexible vinyl plastic pages 65. Each of the flexible vinyl plastic pages 65 underlying the cover sheet 67 is constructed of two or more sheets of overlaying vinyl plastic which are fused together to form pockets or recesses suitable for holding computer disks, compact disks and templates or other related material. FIG. 8 illustrates one of the flexible vinyl plastic pages 65 holding five and one-half inch computer disks. Depending upon the use of the storage container 10, additional or fewer flexible vinyl plastic pages 65 may be attached to the inner, planar surface 51 of the top wall 50 in the assembly process.

Figure 5:
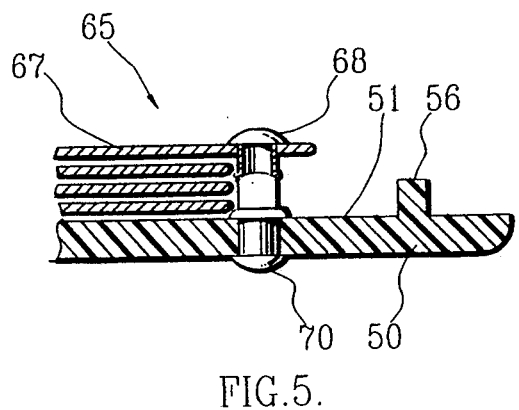
FIG. 5 is a partial cross section side view of the storage container, illustrating the front aligning ridge integrally molded to the top wall and the lower edges of a stack of flexible, vinyl plastic pages. The female portion of the snap attached to the covering vinyl plastic sheet is shown unsnapped from the male portion of the snap which protrudes through the top wall.

The cover sheet 67 has embedded in the lower, centered portion thereof a female portion 68 of a snap 69 which engages with a male portion 70 of the snap 69 which protrudes through the inner, planar surface 51 of the top wall 50. Referring to FIG. 5, the male portion 70 of the snap 69, constructed of metal or plastic, is attached to the top wall 50 and protrudes through the inner, planar surface 51 of the top wall 50. The female portion 68 is embedded through the cover sheet 67. Referring to FIG. 2, the snap 69 is located about equal distance between the left side edge 54 and the right side edge 49 of the top wall 50 just inside the front aligning ridge 56.

Referring to FIG. 1 and FIG. 9, the external latching mechanism consists of the external catch 41 and a hingedly connected external latch 71. The external catch 41 is rigidly molded to the side wall 55. The longitudinal center line of the external catch 41 is an equal distance from a back edge 72 of the side wall 55 and a front edge 73 of the side wall 55. The longitudinal center line of the external latch 71 is an equal distance from the back edge 72 of the side wall 55 and the front edge 73 of the side wall 55 when the inner, planar surface 51 of the top wall 50 is moved into a facing relationship with an outer, planar surface 74 of the interior wall 26 and the external catch 41 comes to rest in the recess 40 of the right side wall 27. The external latch 71 is integrally molded to an outer, planar surface 75 of the right side wall 27 as illustrated in FIG. 9. Pressure on the outside surface of the external latch 71 will cause an inverted L molded to the inner surface of the external latch 71, to come into contact with an external catch inverted L 76 on the external catch 41. The terminating end of the inverted L on the external latch lies slightly below the terminating end of the external catch inverted L 76 when the two are in contact. When the external latch 71 comes into contact with the external catch 41, pressure is required on the outer surface of the external latch 71 to force the terminating end of the inverted L on the external latch 71 to snap into a locked position over the terminating end of the external catch inverted L 76. Pressure applied underneath the inner surface of the external latch 71 forces the terminating end of the inverted L on the external latch 71 in the opposite direction, eventually forcing the terminating end of the inverted L on the external latch 71 to flex and snap over the terminating end of the external catch inverted L 76. The internal latching mechanism consists of the internal latch 21, the internal catch 42, an inverted L 77 of the internal catch 42 and a corresponding inverted L on the internal latch 21. The internal latch 21 and the internal catch 42 interface in the same manner as the outside latching mechanism. The external catch inverted L 76 and the corresponding inverted L on the external latch 71 are each integrally molded to the inner surfaces of the external catch 41 and the external latch 71, respectively, of a resilient material thick enough to withstand continual latching and unlatching. However, the terminating end of the external catch inverted L 76 and the corresponding terminating end of the inverted L on the external latch 71 are semi-flexible to allow latching and unlatching of the storage container 10 without undue pressure.

Referring to FIG. 2, the boundary where the right side edge 49 of the top wall 50 and the left side edge 46 of the rear wall 24 converge is a hinge 78. The boundary where the right side edge 47 of the rear wall 24 and the left side edge 16 of the bottom wall 12 converge is a hinge 79. The boundary where the top edge 28 of the right side wall 27 and the left side edge 39 of the interior wall 26 converge is a hinge 80. The boundary where the internal latch 21 converges with the left side wall 20 is a hinge 81. The boundary where the external latch 71 converges with the right side wall 27 is a hinge 82. The hinges (commonly referred to as "living" hinges) are each formed of a resilient material and are thick enough to provide the strength required to withstand continual flexing due to closure of the storage container 10 and latching thereof.

As seen in FIG. 3, a clear vinyl plastic sheet 83 covers the outer, planar surface of the top wall 50, the rear wall 24 and the bottom wall 12. The clear vinyl plastic sheet 83 is pulled taut and fused to the molded plastic storage container 10 continuously along the left side edge 54 and the front edge 52 of the top wall 50, the front edge 44 of the rear wall 24, and the front edge 14 and the right side edge 17 of the bottom wall 12. The clear vinyl plastic sheet 83 is not fused to the storage container 10 along the back edge 53 of the top wall 50, the back edge 45 of the rear wall 24 or the back edge 15 of the bottom wall 12. In this manner a pocket is created between the inner surface of the clear vinyl plastic sheet 83 and the outer, planar surface of the top wall 50, the outer, planar surface of the rear wall 24 and the outer, planar surface of the bottom wall 12, in which can be placed title pages or other printed or written matter describing the contents of the plastic container 10.

Figure 10:
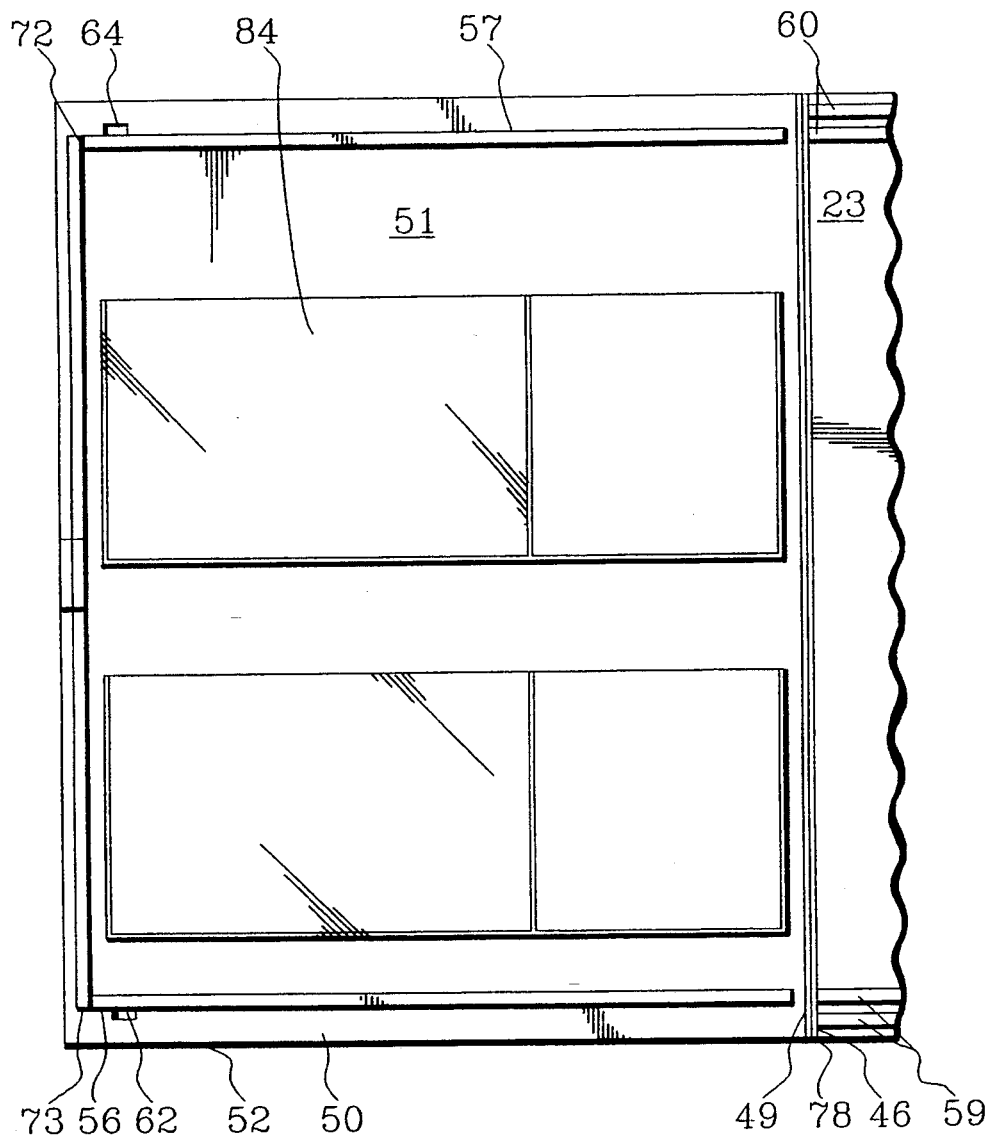
FIG. 10 is a view of the inner, planar surface of the top wall of an alternative embodiment of the present invention.

Referring to FIG. 10, another embodiment is illustrated. In this embodiment computer disks and compact disks are stored in pockets between the inner, planar surface 51 of the top wall 50 and the inner, planar surface of the clear vinyl plastic sheet 83, which is fused to the inner, planar surface 51 of the top wall 50 in a manner so as to form pockets suitable for storing computer disks and compact discs. In such embodiment, neither rivets nor a snap are utilized.

Except for the flexible vinyl plastic pages 65 which hold the computer disks, compact disks, the clear vinyl plastic sheet 83 fused to outer, planar surfaces of the storage container 10 and the two rivets 66 and the snap 69 (in the preferred embodiment), the storage container 10 is made from a plastic resin in a plastic injection molding process. The use of plastic resin allows each of the hinges to be integrally molded with the top wall 50, the rear wall 24, the bottom wall ]2, the interior wall 26 and the latching mechanisms. The only additional manufacturing steps required are fusing the clear vinyl plastic sheet 83 around the outer, planar surface of the top wall 50, the outer, planar surface of the rear wall 24 and the outer, planar surface of the bottom wall 12, as described herein, and manufacturing the flexible vinyl plastic pages 65 and assembling the flexible vinyl plastic pages 65 to the inner, planar surface 51 of the top wall 50 with the two rivets 66, and attaching the male portion 70 of the snap 69 through the top wall 50 and the female portion 68 of the snap 69 through the cover sheet 67. In the alternative embodiment, which does not use the two rivets 66 and the snap 69, the additional manufacturing step, in lieu of assembling the flexible vinyl plastic pages 65 to the inner, planar surface 51 of the top wall 50 with the snap 69 and the two rivets 66, is fusing the vinyl plastic sheet to the inner, planar surface 51 of the top wall 50.

The terms "front", "back", "left", "right", "rear", "bottom", "top", "inner", "outer", "interior" and "side" and words of similar import as used herein are intended to apply only to the position of the parts as illustrated in the drawing, since it is well known that storage containers of the general type illustrated may be oriented in many positions.

While the invention has been particularly shown and described with certain preferred embodiments, it will be understood by those skilled in the art that various alterations and modifications in form and detail may be made therein. Accordingly, it is intended that the following claims cover all such alterations and modifications as fall within the true spirit and scope of the invention.

What is claimed is:

1. A hinged storage container for storing magnetic media and related documentation, said container comprising:

a first wall having two pair of opposed edges, and a substantially planar, inner, surface;

a second wall having two pair of opposed edges and a substantially planar, inner surface;

a rigid spine connected to one of said edges of the first wall by a first living hinge and connected to one of said edges of the second wall by a second living hinge, said first and second living hinges being formed of a resilient material;

a first sidewall and a second sidewall opposed to said first sidewall and a third sidewall and a fourth sidewall opposed to said third sidewall, said first, second third and fourth sidewalls being rigidly formed to a periphery of, and extending generally perpendicular to, the substantially planar, inner surface of said first wall, the third and fourth sidewalls being parallel to said spine;

a rib formed along an inner surface of each of the first and second sidewalls, each rib extending generally parallel to the substantially planar, inner surface of the first wall;

an interior wall hingedly connected to the third sidewall, said third sidewall being located furthest from the spine;

said interior wall being sized to be received within the first and second sidewalls and rest upon said ribs and to overlie a first enclosure defined by said first and second sidewalls;

a fifth sidewall extending perpendicular from the substantially planar, inner surface of said second wall, said fifth sidewall being formed on a periphery of said second wall at the edge opposite the edge hinged to the spine;

a latching means for coupling the interior wall with the fourth opposed sidewall when an inner surface of said interior wall is moved into a facing relationship with the substantially planar, inner surface of the first wall;

a latching means for coupling the fifth sidewall to the third opposed sidewall when the substantially planar, inner surface of the second wall is moved into a facing relationship with an outer, substantially planar surface of the interior wall;

said first wall, first sidewall, second sidewall, third sidewall, fourth sidewall, spine, second wall, fifth sidewall, and interior wall, serving to form two separate enclosures, one of which being said first enclosure;

said container being substantially formed in an injection molding process.

2. A storage container as recited in claim 1 including a means for storing articles in pockets of pages formed of a flexible material attached to the inner, planar surface of said second wall.

3. A storage container as recited in claim 1 including a means for storing articles in pockets formed between sheets made of a flexible material, said sheets being connected to the inner, planar surface of said second wall.

* * * * *